May 28, 1963 S. D. HARPER 3,091,753

CHECKING CIRCUITRY FOR INFORMATION HANDLING APPARATUS

Filed April 10, 1959 5 Sheets-Sheet 1

INVENTOR.
SAMUEL D. HARPER
BY Henry L. Hanson
ATTORNEY

May 28, 1963 S. D. HARPER 3,091,753

CHECKING CIRCUITRY FOR INFORMATION HANDLING APPARATUS

Filed April 10, 1959 5 Sheets-Sheet 2

INVENTOR.
SAMUEL D. HARPER

BY Henry L. Hanson

ATTORNEY

May 28, 1963 S. D. HARPER 3,091,753

CHECKING CIRCUITRY FOR INFORMATION HANDLING APPARATUS

Filed April 10, 1959 5 Sheets-Sheet 3

INVENTOR.
SAMUEL D. HARPER
BY Henry L. Hanson
ATTORNEY

INVENTOR.
SAMUEL D. HARPER
BY Henry L. Hanson
ATTORNEY

INVENTOR.
SAMUEL D. HARPER
BY Henry L. Hanson
ATTORNEY

United States Patent Office 3,091,753
Patented May 28, 1963

3,091,753
CHECKING CIRCUITRY FOR INFORMATION HANDLING APPARATUS

Samuel D. Harper, Auburndale, Mass., assignor to Minneapolis-Honeywell Regulator Company, Minneapolis, Minn., a corporation of Delaware
Filed Apr. 10, 1959, Ser. No. 805,465
15 Claims. (Cl. 340—146.1)

A general object of the present invention is to provide a new and improved information handling apparatus wherein the information handled is continually checked for the presence of any error. More specifically, the present invention is concerned with a new and improved apparatus for checking a digital data processing circuit wherein a positive check is made to determine that each bit handled in the data processor is handled or manipulated without error.

Data processing circuits are utilized in many different ways for purposes of carrying out selected data processing problems. Such circuits may be used, for example, for purposes of data transfer, storage, conversion, or other types of manipulation. Normally, these data processing circuits are reliable and perform without error over long periods of time. However, under certain circumstances, such data processing circuits may fail and the presence of a failure may result in errors that must be positively identified at the instant that they occur.

One known method of checking the operation of a data processor is to arrange the data in groups of bits with an appropriate satellite or weight count appended thereto, said weight count being generated from the data in the number. The weight count is transferred with the data and periodic checks are made to determine if the weight count is appropriately related to the data to which it is appended. A checking circuit of this type is disclosed in a patent issued to R. M. Bloch, bearing Reissue Number 24,447, dated March 25, 1958. As indicated in the above Bloch patent, the satellite number attached to the data may be generated in accordance with any desired modulus. In some instances, it is desirable to perform a checking operation without appending a satellite or checking number to the data being manipulated. In such instances, it is necessary that other checking means be provided to insure that the data being manipulated is being manipulated without error. In accordance with the teachings of the present invention, such a checking circuit is provided wherein each bit of information manipulated is checked after the manipulation, and an error signal is produced if any one single bit is found to be in error. This checking arrangement has been achieved without complete duplication of equipment and in a manner which assures complete protection of a particular data manipulation.

It is therefore a further more specific object of the present invention to provide a new and improved digital data processing apparatus wherein data is manipulated in accordance with a predetermined scheme and each bit of data manipulated is, in fact, checked to insure that all steps of a data manipulation are performed without error.

It is therefore a still further object of the present invention to provide a new and improved data processing apparatus wherein the manipulations performed by such apparatus are checked on a bit-by-bit basis.

The foregoing objects of the present invention are achieved by a new and novel arrangement of logical circuitry wherein an input register utilized in a particular data manipulation will be selectively set upon the initiation of a particular data manipulation and will then be reset upon completion of that manipulation. If the circuitry is not reset upon the completion of the manipulation, an error signal will be indicated.

A further object of the present invention is to provide electrical circuitry for receiving input digital information and being selectively set in accordance with that information, and being reset by the information after data manipulation to insure that the data has been manipulated without error.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
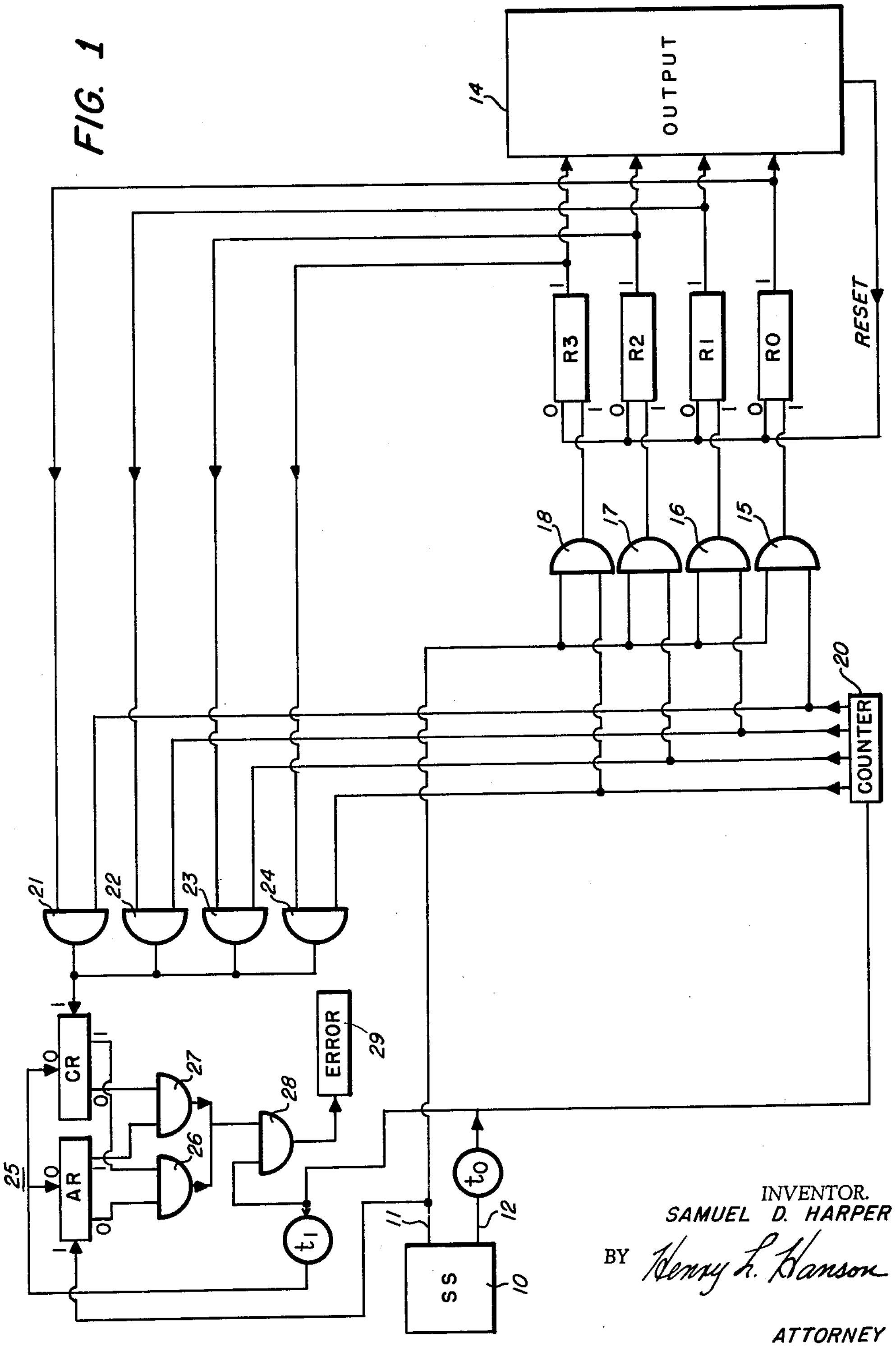
FIGURE 1 is a diagrammatic representation of one form of the invention adapted for use in a serial-to-parallel converter circuit.

Referring first to FIGURE 1, the numeral 10 identifies a signal source which is adapted to produce on an output line 11 a train of digital signals in the form of electrical D.C. signals or electrical pulses which may be arranged, for example, so that the presence of a signal or pulse identifies a "one," and the absence of a signal or a pulse at a particular time identifies a "zero." Signal source 10 has a further output 12 which carries a synchronization pulse produced at a time corresponding to the time each of the data pulses are produced by the signal source 10.

The serial data derived from the signal source 10 is, in FIGURE 1, to be arranged for a parallel transfer to an output consuming circuit 14. The conversion from serial-to-parallel form is effected by way of a plurality of gating circuits 15, 16, 17, and 18, the latter of which are operated in time sequence by a suitable counter 20. The outputs of the gating circuits 15 through 18 are connected to the register circuits R0 through R3, the latter of which may take the form of bistable flip-flops. The outputs of these flip-flops are connected to the output utilization circuit 14. The register units R0 through R3 are adapted to be reset after a parallel transfer by a reset signal derived from the output utilization circuit 14.

The outputs of the registers R0 through R3 are also applied back through a further set of gating circuits 21, 22, 23, and 24, to a checking circuit indicated generally at 25. The checking circuit comprises a pair of bistable flip-flops or register units AR and CR. The register unit AR is adapted to be set any time that a "one" is received from the input signal source 10. The register AR is adapted to be reset by way of a timing signal derived from the signal source 10 on a line 12, the timing signal being delayed by the delay circuit $t_0$ and the further delay circuit $t_1$.

The other register unit in the checking circuit is the register CR. This register is adapted to be set by a feedback signal derived from any one of the gates 21 through 24, and to be reset by the timing signal derived from the signal source 10.

The outputs of the register units AR and CR are compared for identity in a pair of gates 26 and 27. The output of these gates are buffered together on an input of a further gate 28. The output of the gate 28 is in turn connected to a suitable error indicating circuit 29.

In considering the operation of the circuit in FIGURE 1, it should first be noted that the checking operation which is performed is one which effects a positive check of each bit transferred or manipulated by the circuit. At the start of any data manipulation, the registers R0 through R3 will be in the reset state and the registers AR and CR will be reset. It is first assumed that a "one" is received on the output line 11 of the signal source 10. This pulse on the line 11 will be applied to the input of each of the gates 15 through 18. Counter 20, however, is synchronized with the operation of the signal source and will produce an output signal in a sequential manner on the output leads thereof. The first gate opened in the sequence will be the gate 15, so that with a coincidence of a signal on the line 11 and a signal on the lower gate leg of the gate 15 from the counter 20, the gate 15 will be opened and a signal will be transferred through to the set side of the register R0. This will set the register R0 so that the output line for a "one" will become active. With the output "one" line of the R0 register active, a feedback signal will be applied to the gate 21, the latter of which will also be receiving a timing signal from the counter 20. With the gate 21 open, a set signal will be passed through to the register CR.

When the input signal from the signal source 10 appears on the line 11, it is also applied to the set side of the checking register AR. Thus, both the register units AR and CR should be in the set state so that their output "one" lines are active. This will mean that the gates 26 and 27 will remain closed and there will be no output to gate 28. This will indicate that the "one" received from the signal source has been transferred to the output without error.

In the event that the register R0 should not have been set by an output signal from the gate 15, an error condition would exist. This would result in the gate 21 not being opened and the register unit CR not being set. The register unit CR would then be in a reset or "zero" state on its output line. With the register AR set and the register CR reset, the gate 27 will be opened to apply an input signal to the gate 28. The delayed synchronization signal from the line 12 will be applied to the other gate leg of the gate 28 so that in a predetermined time the gate 28 will open and activate the error circuitry 29. The operation of the error circuitry may be utilized in any of numerous ways to provide a signal to stop the transfer of further data, or merely provide an operator with a visual indication of the fact that an error has occurred.

After each bit has been received and transferred, the signal from the synchronization line 12 will be passed through the delay circuits $t_0$ and $t_1$, and will reset the checking registers AR and CR in preparation for a check on the next bit to be transferred.

It is assumed that the next bit received from the signal source 10 is a "zero." In this case, the signal line 11 will not carry a pulse and consequently, the next gating circuit, gate 16, will not be active to produce an output pulse even though the counter 20 may be supplying a signal to the other gate leg thereof. Consequently, the register R1 will remain in the reset or "zero" state so that the output line will be inactive. Since the output line of the register R1 will be inactive, the feedback gate 22 will not be opened. Thus, the circuit register CR will remain in the reset state. Since there was no signal on the input line, the other checking register AR will also be in the reset state. Assuming the gates 26 and 27 to be closed, there will be no output signal suitable for actuating the error circuitry.

If the third input signal received on line 11 in the sequence represents a "one," this "one" will be inserted in the register R2 by way of the gate 17. This signal will also be used to set the checking register AR. The setting of the register R2 will be effective, by way of the gate 23, to set the checking register CR. When both of the registers AR and CR are set, the gates 26 and 27 will remain closed and the absence of a signal from these gates will indicate an error-free transmission. If the fourth signal on the line 11 should represent a "zero," the gate R3 will remain in the reset state and the checking registers AR and CR will also remain in the reset or "zero" state.

With the registers R0 through R3 being loaded, the information may then be transferred by way of a parallel transfer to the output circuit 14 after which a reset signal is produced and is utilized to reset the registers R0 through R3 so that their respective output lines are all inactive.

It will be seen that the circuitry of FIGURE 1 provides for a positive check of each bit being transferred from the signal source 10 to the output 14, and that if any one bit should be lost or falsely indicated, the checking circuitry 25 will provide a positive indication of this fact and the error circuit will be operated. It will be readily apparent that this arrangement will result in a checking of all of the electronic circuitry included within the checking loop, and the amount of equipment represented by the gating circuitry 15 through 18 and the registers R0 through R3 may be expanded considerably in scope and dimension so long as each bit at the output of the transfer or manipulation circuitry is suitably identifiable and can be related back to the input bit received from the signal source.

Figure 2:
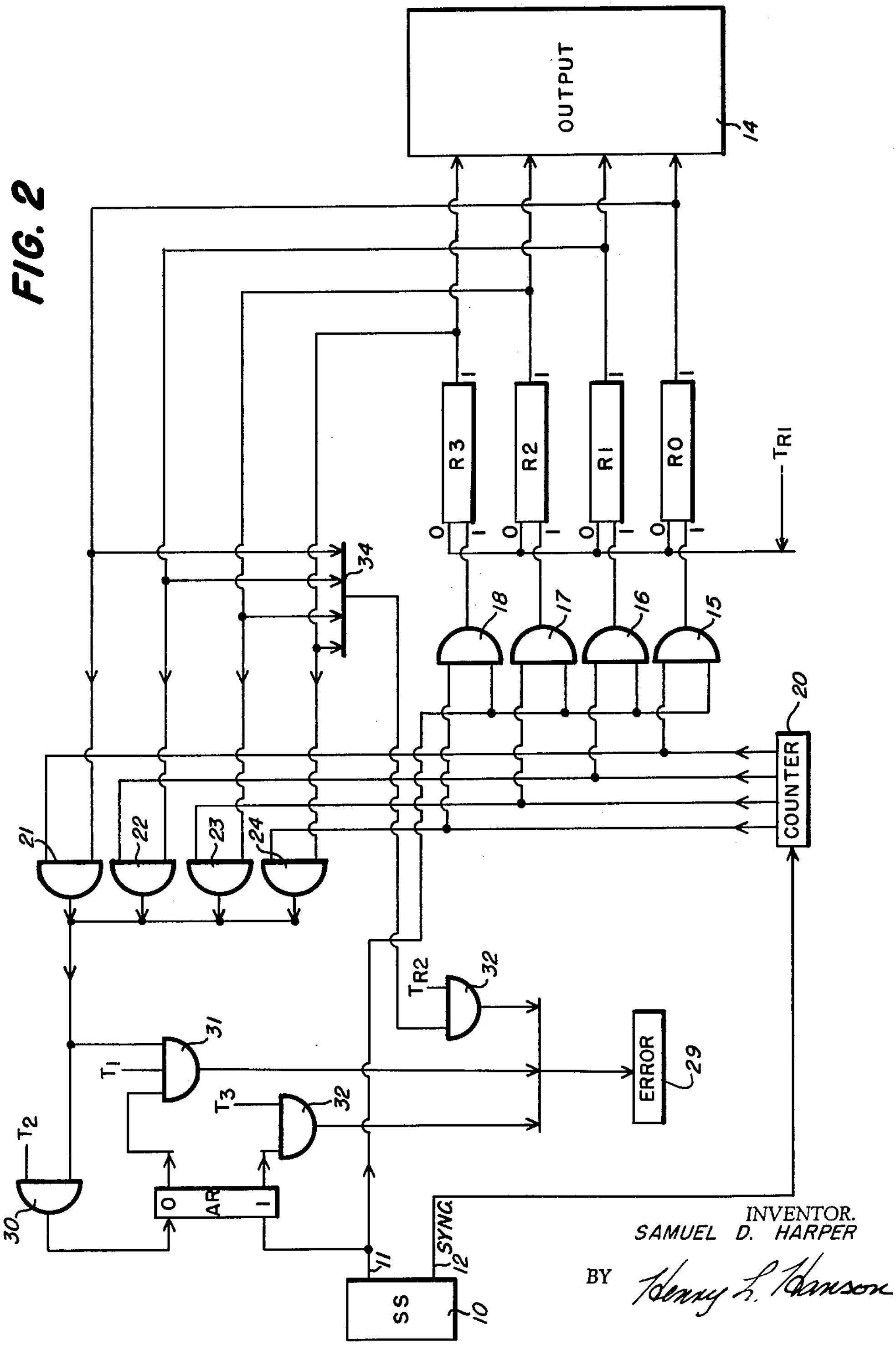
FIGURE 2 is a modified form of a serial-to-parallel conversion circuit using the principles of the invention.

Referring next to FIGURE 2, there is here illustrated a modified form of checking circuitry applied to the same basic data manipulation discussed above in connection with FIGURE 1. In the circuitry of FIGURE 2, corresponding components between this figure and FIGURE 1 carry corresponding reference characters. Thus, the circuitry of FIGURE 2 is arranged to take serial information in from the signal source 10 and transmit the same to an output utilization circuit 14 by way of a serial-to-parallel conversion circuit, including the registers R0 through R3.

In the checking circuit of FIGURE 2, a single checking register AR is provided, and this register is adapted to receive a set signal whenever a "one" is received from the signal source 10 on the line 11. The register AR is adapted to be reset whenever a "one" is received through the feedback gates 21 through 24, and a further control gate 30.

A complete checking operation on the circuits is effected at a selected time schedule for each bit transmitted. The checking is to determine if the register AR is set at a time when it should not be set, or is not set at a time when it should be set. In addition, a check is made to determine that each of the registers R0 through R3 are reset at a time when such registers should be reset. This sequential checking is effected by way of a series of gating circuits receiving appropriate input clock signals from a clock source, not shown. Thus, a gating circuit 31 is provided for checking the reset state of the register AR, a gate 32 is provided for checking the set state of the register AR, and a further gate 33 is provided for checking the reset state of the registers R0 through R3 by way of a buffer circuit 34. In considering the operation of the circuitry of FIGURE 2, it should first be noted that the apparatus is adapted to have serial input information on the input line 11 and produce on the output by way of the registers R0 through R3 information in parallel form. The gating of the serial bits coming in from the signal source 10 into the registers R0 through R3 will be controlled by the counter 20, selectively activating the gates 15 through 18. After a particular group of bits have been fed into the registers R0 through R3, an output transfer is effected to the output circuitry 14 and then the registers are reset in preparation for the next input transfer. The resetting is accomplished by the timing pulse $T_{R1}$.

Like the circuitry of FIGURE 1, the circuitry of FIG-

URE 2 effects a bit-by-bit check on each bit transferred. Thus, for example, it is first assumed that a "one" bit is received on the line 11. This "one" bit will be applied by way of the line 11 and input gate 15 to set the register R0 to the "one" state. The signal on line 11 will also be applied to the checking register AR to switch this register to the set state, or the "one" state. The output of the register R0 will be fed back by way of the gate 21 to the inputs of the gates 30 and 31. The gate 31 has a clock pulse $T_1$ applied thereto and at this particular instant, if the register AR is in the "one" state, the output "zero" line of the register AR should be inactive, so that a signal coming through the gate 21 to the gate 31 will not be able to pass.

Upon the occurrence of the next clock pulse $T_2$, the gate 30 will be activated by the signal coming from the gate 21 so that the register AR may be switched to the reset state. Upon the occurrence of the next timing pulse $T_3$, the gate 32 will be conditioned to be opened by this pulse. However, since the checking register AR has been switched to the reset state, the output "one" line of the register will be inactive and consequently, there will be no output signal from the gate 32 for application to the error circuit. Thus, after time $T_3$, the circuit will be in a condition to receive the next bit on the signal line 11. If the next bit should be a "one," the same operation will take place with the register AR being first set and then reset by the feedback with selective checking made to determine that the register AR is capable of assuming both the set and the reset states. If the register AR should lock up in either the set or the reset state, an error signal will be produced by the output of the gates 31 or 32, depending upon the state in which the circuit should become inoperative.

In the event that a "zero" is received on the input line 11, there will be no signal applied to the register AR, tending to set the register. Similarly, the output of the register R will be inactive and consequently, no signal will be received on the feedback gating circuits for application to the inputs of the gates 30 or 31. This will mean that at time $T_1$, the gate 31 cannot open since there is no feedback signal. At time $T_2$, nothing will pass through the gate 30, and this will be of no consequence since the register AR is already in the reset state. At time $T_3$, the gate 32 will remain closed for the reason that the register AR has not been set. However, should the "zero" be supplied by the signal source 10, and an error be created in the circuitry such that one of the output registers R produced a signal, this fact would be detected for the reason that a feedback signal would appear through the feedback gates on the checking gate 31. This feedback signal from the output register R would result in a signal passing through the gate 31 at time $T_1$ to set the error circuitry 29.

A further check is provided at the end of the output operation after a series of input bits have been appropriately manipulated. Thus, at time $T_{R1}$, the registers R0 through R3 are all reset. If they are all reset, their output lines passing to the output circuitry 14 will be reset. With all of the output lines of the registers R being inactive, there should be no signal coupled through the buffer 34 to the input of the gate 33. A check is made immediately after the reset pulse on the registers R0 through R3 at time $T_{R2}$. If any one of the registers should be in the set state, a signal will be applied to the control signal gate leg of the gate 33 with the timing pulse $T_{R2}$, and an output signal will be passed by the gate 33 to the error circuitry 29.

It will be apparent from this review of FIGURE 2 that a bit-by-bit check is made of each input, and a further check is made of the output circuitry to determine the operability thereof at the end of a particular multiple bit operation.

Figure 3:
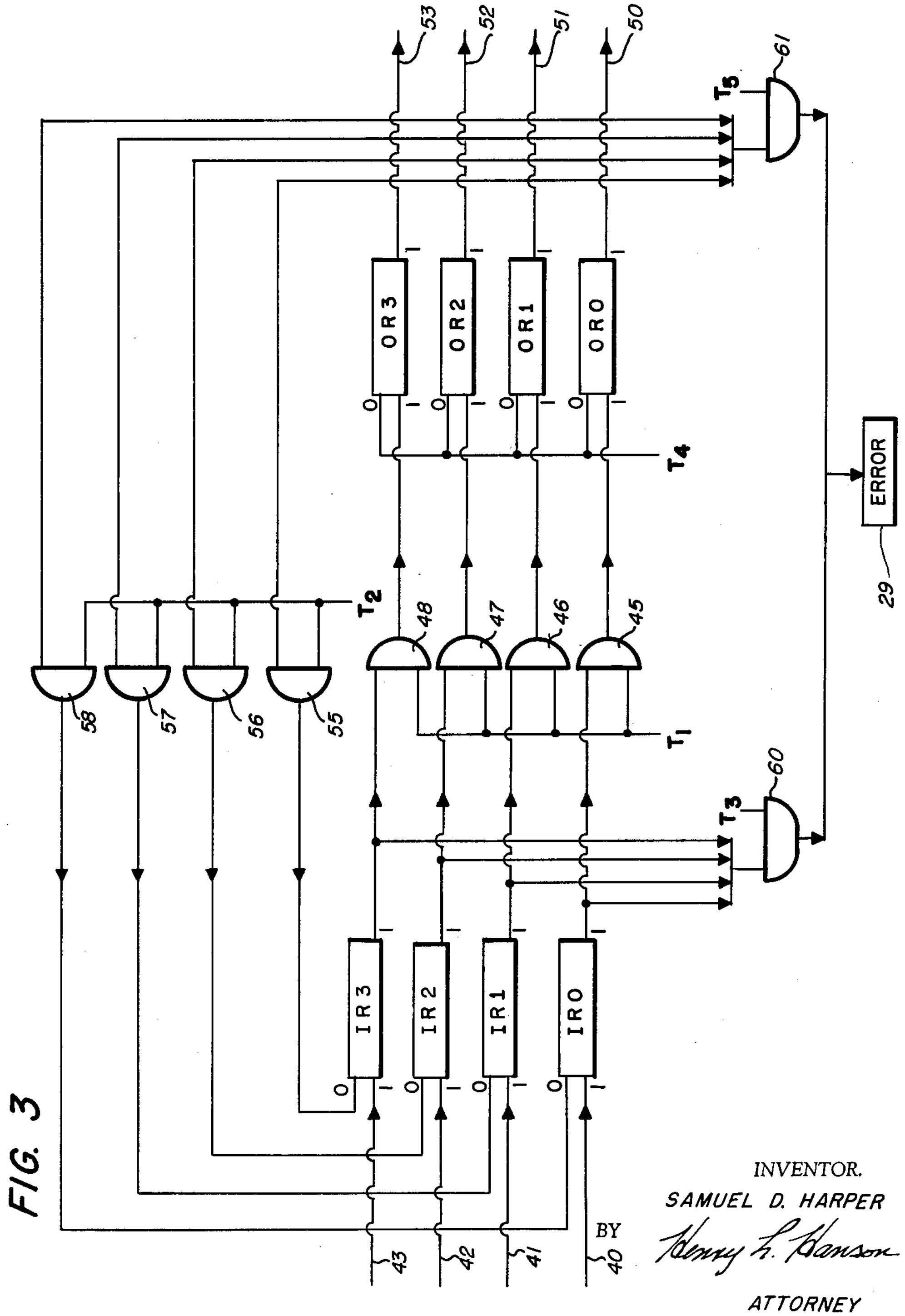
FIGURE 3 illustrates diagrammatically how the invention may be applied to a parallel transfer circuit.

Referring next to FIGURE 3, there is here illustrated circuitry for receiving information on the input in parallel and transferring the same to the output by way of a parallel transfer. As will be apparent from the description that follows, each bit of information transferred is positively checked to determine whether or not the transfer was error-free. More specifically, four parallel input lines 40, 41, 42, and 43 are provided and are connected to the set side of a plurality of input register elements IR0, IR1, IR2, and IR3, all of which are of the bistable type.

Data received on the input lines 40 through 43 is adapted to be applied to the input registers IR0 through IR3. From there, the data may be transferred by way of a parallel transfer to the output registers OR0 through OR3. The transfer between the input registers IR and the output registers OR is by way of a series of gates 45, 46, 47, and 48. Each of these gates is adapted to be gated to an active state by a timing pulse $T_1$ when it is desired to transfer the information from the input registers IR to the output registers OR. At a desired time, the information in the output registers will be available on the output lines 50, 51, 52, and 53.

In order to effect a desired checking within the circuitry, the information appearing on the output registers OR is fed back through a series of feedback gates 55, 56, 57, and 58, to the reset side of the input register units IR. After a transfer has been completed, timing signal $T_4$ is applied to the reset side of each of the output registers OR.

At a selected time in the transfer cycle, at time $T_3$, a gate 60 will be opened if any one of the input registers IR has not been reset. At a later time, a check is made to determine if the output registers OR have been reset by way of a further gate 61. The gate 61 will be gated into an active state at time $T_5$. In the event that either gate 60 or gate 61 should have an output, a signal will be applied to the error circuitry 29.

In considering the operation of the circuitry of FIGURE 3, prior to a data transfer, the input register stages IR should all be in the reset state so that the output "one" lines are all inactive. Similarly, the output register circuits OR should be in the reset state so that the respective output "one" lines are all inactive. In the event that four input "ones" are received by a way of a parallel transfer on the input lines 40 through 43, each of the input register circuits IR0 through IR3 will be switched to the "one" state, or the set state. This will activate the "one" lines on the output of these registers so that upon the application of the timing pulse $T_1$, the gates 45 through 48 will be opened and a "one" signal will be transferred through to the output register circuits OR. This will in turn set these output registers circuits OR to the "one" state on their output lines, and the output lines 50 through 53 will carry an appropriate output signal.

At time $T_2$, the presence of the signals on the output lines of the output registers OR will be passed through the gating circuits 55 through 58 back to the reset inputs on the input registers IR0 through IR3. This will switch all of the input registers back to the reset state, if the circuits are operating properly, so that the "one" lines on the output thereof will become inactive. At time $T_3$, a check is made to determine if any one of the output "one" lines of the input register circuits IR is active. If they are all inactive, the gate 60 will remain closed. If one or more of the lines should be active, then the gate 60 will be opened at time $T_3$ and an error signal will be indicated. At time $T_4$, the output registers OR are all reset and then at time $T_5$, a check is made to determine if these register circuits have been reset. Thus, if any of the output registers OR remains in the "one" state, a signal will be applied through the gate 61 at $T_5$, and an error will be indicated.

If the transfer has been made without error, no signals will appear on the error circuit, and the circuit will be conditioned to receive the next input parallel transfer. It will be apparent from the description of FIGURE 3 that each bit of information receives a positive check to determine whether or not the bit received at the input has in fact been transferred to the output of the associated circuitry.

Figure 4:
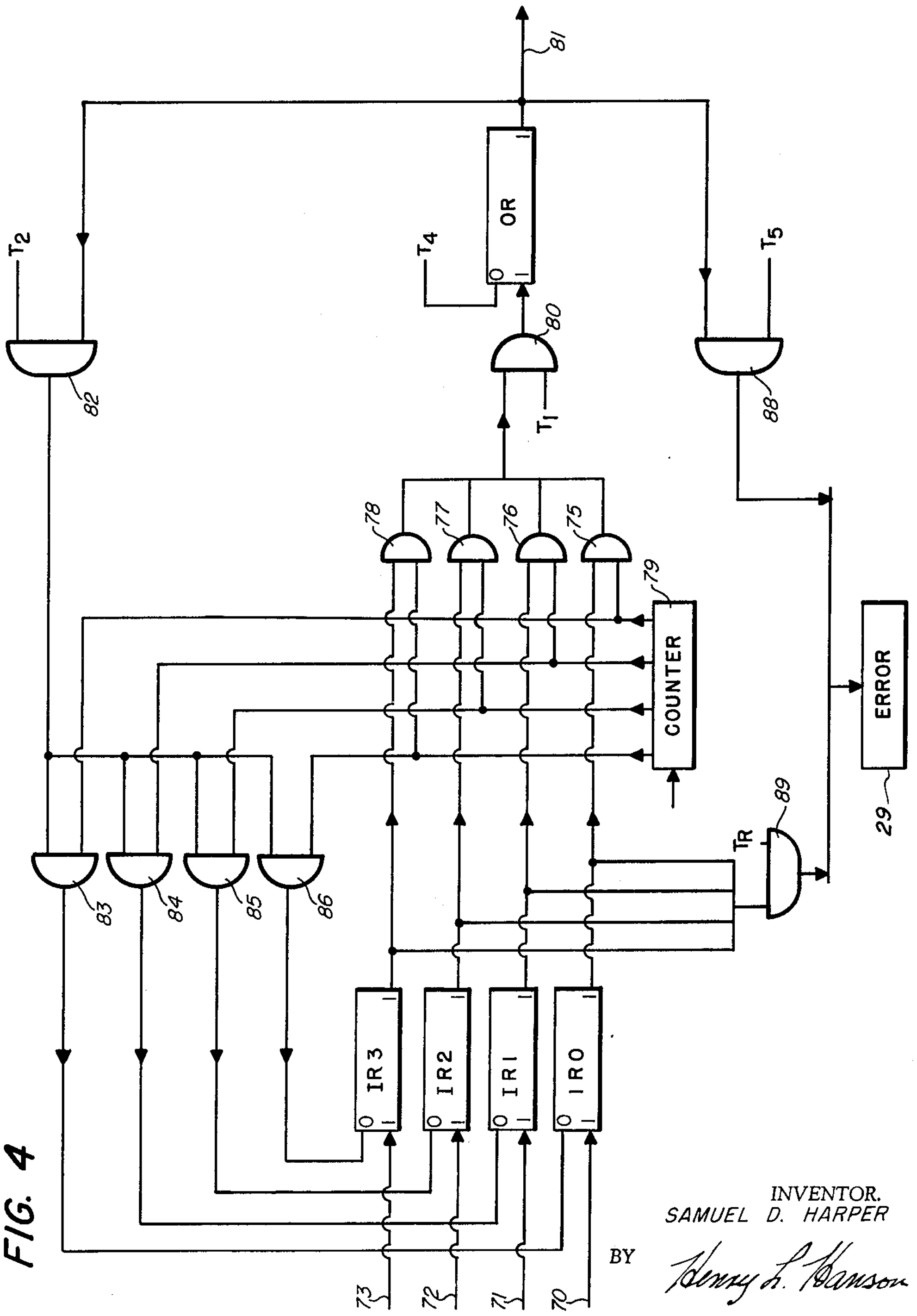
FIGURE 4 illustrates how the principles of the invention may be applied to a parallel-to-serial converter circuit.

The circuitry of FIGURE 4 is representative circuitry for receiving a parallel input and supplying the data on the output in serial form. Thus, there are provided four parallel input lines 70, 71, 72, and 73. These input lines are connected to the set side of a series of input registers IR0, IR1, IR2, and IR3. The outputs from the input registers IR0 through IR3 are adapted to be selectively gated through a plurality of gating circuits 75, 76, 77, and 78 in accordance with timing or gating signals derived from a suitable counter circuit 79.

The output data from the gates 75 through 78 is gated by way of a further timed gate 80, the latter having an input timing pulse $T_1$ which conditions the gate for opening so that when a "one" is received through any one of the gates 75 through 78, the signal may be used to set an output register OR. The output of the output register is adapted to be applied to an output line 81. The output from the output register OR is connected through a feedback gate 82 to a plurality of distribution gates 83, 84, 85, and 86, the latter being controlled by the counter 79, and supplying reset signals to the input registers IR0 through IR3.

The output from the register OR is also applied to a further gate 88, the latter of which has an input timing signal $T_5$ applied thereto. The gate 88 is connected to the error circuitry 29.

A further gating circuit 89 is provided, and this gating circuit includes an input gate line having buffered thereto the outputs of the input register circuits IR0 through IR3. The timing of this gating circuit is controlled by a timing signal $T_R$. A timing signal $T_4$ is used for resetting the output register OR after each individual bit has been transferred.

Concerning the operation of the circuitry of FIGURE 4, it is first assumed that there is a parallel input transfer by way of the input lines 70 through 73. If the input transfer is such that four "ones" are transferred into the input registers IR, then the circuitry should produce in the output a train of four "ones" in serial form on the output line 81. The transfer will be effected sequentially by way of the gates 75 through 78 as the counter 79 selectively opens the gates associated with the respective input registers IR0 through IR3.

After each bit is transferred from the input register IR through the gating circuitry 75 through 78 into the output register, the output from the output regiser OR will be fed back through the feedback gate 82 at time $T_2$ and will be applied to the gating circuits 83 through 86. If a "one" has been transferred from the input register IR0 to the output register OR, the feedback "one" will pass through the gate 82 to the gatge 83, and the gate 83 will be opened by the counter timing pulse which is activated at the gate 75. This signal in turn will apply a reset signal to the input register IR0 so that the output "one" line thereof will become inactive. This feedback process will take place for any other bit representing a "one" in the input register so that, if the circuit is operating properly, the input register will be returned to the reset state so that the output line will be inactive. Further, after each bit is transferred to the output register OR, the timing signal $T_4$ will reset the output register in preparation for the next serial transfer. After the output register OR has been reset, the output line thereof should be inactive so that no signal will be able to pass through the gate 88 at time $T_5$.

After all of the bits for a particular parallel transfer have been transferred out on the output line 81, the timing signal $T_R$ will be applied to the gate 89 to check and see if all of the input registers IR have been switched to the reset state so that their output lines are all inactive. If they are not inactive, a signal will be passed through the gate 89 to the error circuit.

As with the previous figures, it will be apparent that the configuration shown in FIGURE 4 will make a complete bit-by-bit check of all of the information transferred or manipulated thereby.

Figure 5:
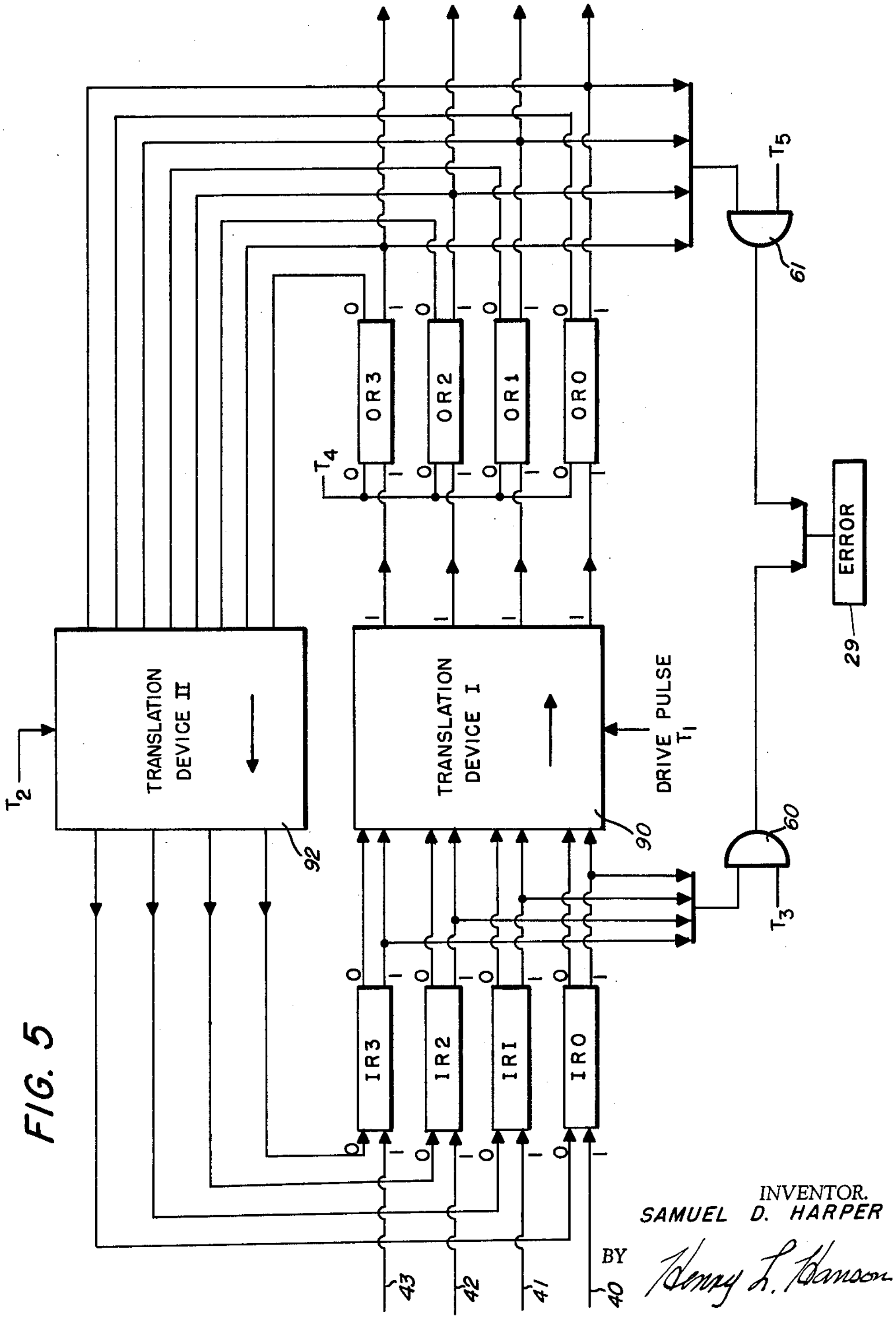
FIGURE 5 illustrates how the principles of the invention may be applied to a more complex translation or conversion circuit.

FIGURE 5 shows how the principles of the invention may be applied to a more complex translation manipulation wherein data may undergo a predetermined conversion as from one form of binary code to another, and then applied to the output. The circuitry of FIGURE 5 is basically the same as that of FIGURE 3, with the exception that the circuit is illustrated with a more complex type of translation device existing between the input registers IR and the output registers OR. Corresponding components between FIGURES 3 and 5 carry corresponding reference identification. The only change in the circuitry is the substitution of a generalized type of translation device 90 and a further translation device 92. The translation devices 90 and 92 may be associated with any desired type of conversion, such as a conversion from one form of binary code to another. In the conversion process, it is assumed that the output from the translation device 90 is coupled to the output registers OR, and that the output is then available for external transmission. The output registers OR are coupled to the translation device 92 which reconverts the data to its original form where it may then be applied back to the input registers IR to reset the input registers at any point where the registers may have been set by input information.

After each translation has been completed in both the forward direction and in the feedback direction, a check is made at time $T_3$ by way of the gate 60 to determine if each of the input registers IR have all been reset. Similarly, after a transfer out through the output registers OR, after the registers OR have been reset by the timing signal $T_4$, a further check is made at time $T_5$ by way of the gate 61 to determine if all of the output registers OR have been reset.

It will be apparent that if an error has taken place in the translation in the forward direction or in the reverse direction, the registers associated with the input and output will not end up in the reset state at the time that they are tested by way of the gates 60 and 61, so that should any bit be transferred or manipulated in error, there will be a resultant error indication.

It will be readily apparent from the foregoing description that the principles involved in checking each individual bit in the course of its manipulation may be extended to various combinations of the above so that each individual manipulation receives a complete check. For example, the serial-to-parallel conversion circuit in FIGURE 2 might well be arranged so that the registers R0 through R3 correspond to the input registers for FIGURE 3. Similarly, the output registers of FIGURE 3 might well be the input registers illustrated in FIGURE 5. The checking performed would then be in accordance with the individual steps performed in the manipulation so that any error or circuit failure could be identified. Further, the checking technique could be extended over the complete combination so that the feedback would be around several sections of data manipulation, as is contemplated generally by the embodiment illustrated in FIGURE 5.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. Checking apparatus for a data processor comprising an input digital signal source, a transfer circuit having an input and an output, said transfer circuit being adapted to transfer a plurality of bits of digital data, an output utilization circuit, means connecting the input of said transfer circuit to said digital signal source and the output of said transfer circuit to said output utilization circuit, a first bistable checking register connected to said signal source, a second bistable checking register connected to said output of said transfer circuit, said first and second registers being adapted to be set by each one of the like bits of digital data, and comparison means connected to said registers to produce an output signal indicative of a lack of bistable identity of output from said registers upon the transfer of each bit through said transfer circuit.

2. Checking apparatus for a data processor comprising an input digital signal source, a transfer circuit having an input and an output, an output utilization circuit, means connecting the input of said transfer circuit to said digital signal source and the output of said transfer circuit to said output utilization circuit, a first checking register comprising a bistable flip-flop circuit connected to said signal source, a second checking register comprising a bistable flip-flop circuit connected to said output of said transfer circuit, said first and second registers being adapted to be set by each one of the like bits of digital data transferred by said transfer circuit, comparison means connected to said registers to produce an output signal indicative of a lack of identity of output from said registers, and reset means connected to said first and second registers to periodically reset said registers if they have been set.

3. Checking apparatus for a data processor comprising an input digital signal source, a serial-to-parallel data conversion circuit having an input and an output, an output utilization circuit, timing means connecting the input of said conversion circuit to said digital signal source and the output of said conversion circuit to said output utilization circuit, a first bistable checking register connected to said signal source, a second bistable checking register, means including said timing means connecting said output of said transfer circuit to said second checking register, said first and second registers being adapted to be set by each one of the like bits of digital data converted by said conversion circuit, and comparison means connected to said registers to produce an output signal indicative of a lack of identity of output from said registers.

4. A chicking circuit for a data processor comprising an input digital data signal source being adapted to supply a plurality of bits of digital data, a digital data transfer circuit having an input connected to said signal source and an output, a bistable register element connected to said signal source and to the output of said transfer circuit, said signal source being adapted to set said register element to a first bistable state and said output being adapted to set said register element to a second bistable state, an error sensing circuit, timing means having a timing cycle which is a direct function of each bit of data transferred and means including said timing means connecting said register element to said error circuit to conditionally activate said error circuit for each bit supplied to said transfer circuit.

5. A checking circuit for a data processor comprising an input digital data signal source, a digital data transfer circuit having an input connected to said signal source and an output, a bistable flip-flop register connected to said signal source and to the output of said transfer circuit, said signal source being adapted to set said register to a first bistable state upon the transfer of each occurring one of a selected type of bit, and said output being adapted to set said register to a second bistable state when said bit has been transferred to said output, an error sensing circuit, timing means having a timing cycle which is a direct function of each data bit transferred, and means including said timing means connecting said register to said error circuit to activate said error circuit if said register is in said first state at a first time in said timing cycle and said register is in said second state at a second time in said timing cycle.

6. A checking circuit for a data processor comprising an input digital data signal source, a digital data transfer circuit having an input connected to said signal source and an output and being adapted to transfer a plurality of bits of digital data, a bistable register element connected to said signal source and to the output of said transfer circuit, said signal source being adapted to set said register to each first bistable state when a "one" bit is received from said signal source and said output being adapted to set said register to a second bistable state when each "one" bit appears on said output, an error sensing circuit, and means including timing means connecting said register to said error circuit to conditionally activate said error circuit when said error circuit is in said first state after a "one" bit has appeared at said output.

7. A data processing circuit comprising a bistable register having an input, adapted to be connected to a digital signal source and switched to a first bistable state each time a selected type of bit is received from said source, and an output, a transfer circuit having an input and an output, said transfer circuit input being connected to said register output, and feedback means connecting said transfer circuit output to said bistable register to switch said register to a second bistable state when each one of said selected type of bits is transferred by said transfer circuit, and error sensing means connected to said register to sense when said register is in said first bistable state after said selected bit has been transferred.

8. A data processing circuit comprising a first bistable register having an input, adapted to be connected to a digital signal source and switched to a first bistable state each time a selected type of bit is received from said source, and an output, a transfer circuit comprising a second bistable register having an input and an output, said transfer circuit input being connected to said register output, and feedback means connecting said transfer circuit output to said first bistable register to switch said first register to a second bistable state when each one of said selected type of bits is transferred by said transfer circuit, reset means connected to said second bistable register, and error sensing means connected to said first and second registers to sense when said registers are in said first bistable state after each one of said selected bits has been transferred, and said second register has been reset.

9. A data processing circuit comprising a first bistable register having an input, adapted to be connected to a digital signal source and switched to a first bistable state each time a selected type of bit is received from said source, and an output, a transfer circuit comprising a second bistable register having an input and an output, said transfer circuit input being connected to said first register output, and feedback means connecting said transfer circuit output to said first bistable register to switch said first register to a second bistable state when each one of said selected type of bits is transferred by said transfer circuit, reset means connected to said transfer circuit to switch said second bistable register to a reset state following each transfer, error sensing means, a first timed gating means connecting said first register to said error sensing means, and a second timed gating means connecting said second register to said error sensing means.

10. A data processing circuit comprising a plurality of bistable input register elements adapted to be set by input digital signals of a first bit type, a plurality of parallel input signal lines connected to said register elements, an output transfer circuit connected to be controlled by digital data set into said input register elements, means connecting said output transfer circuit back to said input register elements to reset each one of said elements which transferred said first bit type of digital signal, and error sensing means connected to said register elements to sense the presence of any element in the set state following a transfer of digital data.

11. A data processing circuit comprising a plurality of bistable input register elements adapted to be set by input digital signals of a first bit type, a plurality of parallel input signal lines connected to said register elements, an output transfer circuit connected to be controlled by digital data set into said input register elements, means connecting said output transfer circuit back to said input register elements to reset each one of said elements which transferred said first bit type of digital signal, reset means connected to said transfer circuit to reset said circuit following a data transfer, and error sensing means connected to said transfer circuit and to said register elements to sense the presence of any element in the set state following a transfer of digital data.

12. A data processing circuit comprising a plurality of bistable input register elements adapted to be set by input digital signals of a first bit type, a plurality of parallel input signal lines connected to said register elements, a plurality of output register elements forming an output transfer circuit connected to be controlled by digital data set into said input register elements, timed gating means connecting said output transfer circuit back to said input register elements to reset each of said elements when said first bit type of digital signal has been transferred by each respective element, reset means connected to said output register elements, and error sensing means connected to said input and output register elements to sense the presence of any element in the set state following a transfer of digital data.

13. In combination, a data input circuit comprising an input bistable register which is adapted to be set and reset, a data translator connected to said input register to modify the data therein, a feedback data translator connected between an output of said data translator and an input of said input register, said feedback translator being connected to reset said input register each time said input register has been set by input data, and checking means connected to said input register to sense if said register has been reset at a selected time.

14. In combination, a data input circuit comprising a plurality of bistable registers which are adapted to be set and reset, a data translator connected to said input registers to modify on the output thereof the data from said registers, a feedback translator connected between an output of said data translator and inputs on said input registers, said feedback translator being connected to reset said input registers each time said input registers have been set by input data, and checking means connected to said input register to sense if said input registers have been reset at a selected time.

15. In combination, a data input circuit comprising an input bistable register which is adapted to be set by input data and reset, a data translator connected to said input register to modify the data therein, an output bistable register connected to said data translator and adapted to be set and reset by each bit of data from said translator, reset means connected to said output register, a feedback translator connected between an output of said data translator and an input of said input register, said feedback translator being connected to reset said input register each time said input register has been set by input data, checking means connected to said input register to sense if said register has been reset at a selected time following each translation and feedback by said data translator and said feedback translator respectively, and means connecting said checking means to said output register to see if said output register has been reset at a selected time.

References Cited in the file of this patent

UNITED STATES PATENTS

| | | |
|---|---|---|
| 2,837,278 | Schreiner et al. | June 3, 1958 |
| 2,848,607 | Maron | Aug. 19, 1958 |
| 2,910,235 | Southard | Oct. 27, 1959 |
| 2,933,364 | Campbell | Apr. 19, 1960 |
| 2,958,072 | Batley | Oct. 25, 1960 |
| 2,963,697 | Giel | Dec. 6, 1960 |